H. E. KITTREDGE.
NUT LOCK.
APPLICATION FILED MAR. 26, 1908.
946,055.
Patented Jan. 11, 1910.
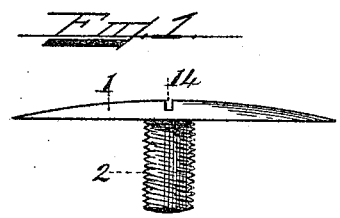
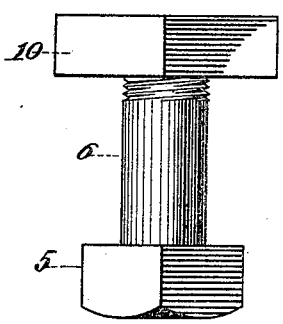
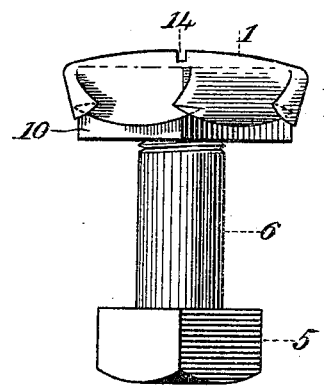
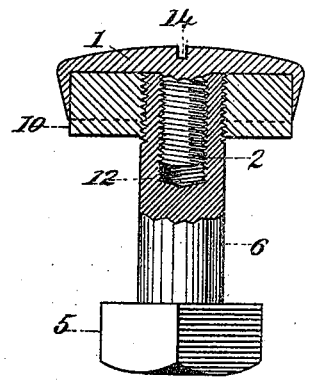
Witnesses:
E. F. Uniac
Charles F. Richardson
Inventor:
Henry E. Kittredge
By Francis J. W. Dakin
his atty

UNITED STATES PATENT OFFICE.

HENRY E. KITTREDGE, OF BOSTON, MASSACHUSETTS.

NUT-LOCK.

946,055.   Specification of Letters Patent.   Patented Jan. 11, 1910.

Application filed March 26, 1908.   Serial No. 423,330.

*To all whom it may concern:*

Be it known that I, HENRY E. KITTREDGE, a citizen of the United States, residing at Boston, in the county of Suffolk and State of Massachusetts, have invented a new and useful Improvement in Nut-Locks, of which the following is a specification, reference being had therein to the accompanying drawings.

My invention relates to devices for locking bolt-nuts and the like securely against displacement and the object of my invention is to provide a nut-lock which may be easily applied to and removed from the nut and which, when applied to a nut, will effectively lock the nut in position and prevent it being loosened or displaced by vibration, jarring or other cause.

The following is a clear description of my invention, reference being made to the accompanying drawings, in which like numbers refer to like parts throughout the several views, and in which:

Figure 1 is a side elevation of the nut-lock; Fig. 2 is a side elevation of a nut and bolt to which the nut-lock may be applied; Fig. 3 is a side elevation of the nut-lock applied and secured to the nut and bolt shown in Fig. 2; and Fig. 4 is a vertical sectional view partly in elevation of the nut-lock applied and secured to the nut and bolt shown in Fig. 2.

My invention consists broadly in a screw having a left-handed thread and a broad head of malleable metal adapted to be turned down against the side or sides of the nut to which the lock is applied.

In the drawings illustrating the preferred form of my invention, the nut-lock is made up of a head-portion 1 and a screw-portion 2 provided with a left-handed thread. A bolt of ordinary form is also shown with a head 5 and a pin-portion 6 having a right-handed thread on its end, together with a nut 10. If, for any reason, the thread on the bolt is left-handed then the thread on the screw-portion 2 of the nut-lock should be right-handed, since they are intended to be opposite threads. The diameter of the head-portion 1 must be greater than the diameter of the nut to which it is designed to be applied and the holding power of the nut-lock will, of course, vary with the extent to which the edges of the head portion 1 overlap the sides of the nut. In order to apply my device to a bolt for the purpose of locking the nut, it is necessary to provide the end of the pin-portion 6 of the bolt with a longitudinal bore 12 having an interior left-handed thread. The head portion 1 of the nut-lock should be of stout malleable material in order that it may be bent over to lock the nut, and should not be so soft that the twisting strain exerted by the nut will be liable to bend it.

In actual use, my nut-lock is designed to be applied and to operate as follows. The bolt-nut 10 is secured on the pin-portion 6 of the bolt and the screw-portion 2 of my nut-lock is then screwed into the bore 12 until the head-portion 1 contacts and binds the nut 10. When the nut-lock has been turned until it contacts and binds the bolt-nut 10 it will be found impossible to turn the bolt-nut to unscrew it from the bolt since the more it is turned for that purpose the stronger it binds against the nut-lock. After the nut-lock has been turned until it binds against the bolt-nut the edges of the head 1 of the nut-lock are then bent over as shown in Fig. 3 against the sides of the bolt-nut 10. It will, in most cases, be sufficient to turn over but a small portion of the edge of the nut-lock against one side of the bolt-nut, but if necessary the entire periphery of the head of the nut-lock may be turned downwardly over the sides of the bolt-nut, irrespective of whether the bolt-nut is square, hexagonal or other form. When the bolt-nut is thus locked it will be impossible for it to jar loose as any unscrewing movement of the bolt-nut simply causes the nut-lock to be screwed down more securely to the bolt-nut.

The nut-lock may be removed by turning up the edges of its head from the sides of the bolt-nut whereupon it may be unscrewed with the fingers. The head of the nut-lock is provided with a recess 14 to receive a screw-driver in order to facilitate the adjusting and removing of the nut-lock.

What I claim is:—

1. In a nut-lock, the combination of a bolt having a threaded portion and provided with a central longitudinal threaded bore, the thread of said bore being the reverse of the thread on the outside of the bolt, a nut threaded on said bolt and a lock having a screw-portion threaded into said bore and a flat head-portion of larger diameter than the diameter of said nut adapted to be bent over the sides of said nut to lock the same when in position.

2. In a nut-lock, the combination of a bolt having a threaded portion and provided with a central longitudinal threaded bore, the thread of said bore being the reverse of the thread on the bolt, a nut threaded on said bolt and a lock having a screw-portion threaded into said bore in said bolt and a flat malleable head of larger diameter than the diameter of said nut adapted to have its edges bent over the sides of said nut to lock the same in position.

3. In a nut-lock, the combination of a bolt having a threaded portion and provided with a central longitudinal threaded bore, the thread of said bore being the reverse of the thread on the bolt, a nut threaded on said bolt and a lock having a screw-portion threaded into said bore in said bolt and a flat, circular head-portion of malleable material and of larger diameter than the diameter of said nut and adapted to have its projecting edges bent over the sides of the said nut to hold it in a locked position.

In testimony whereof, I hereunto set my hand, in the presence of two subscribing witnesses, this the tenth day of March, 1908.

HENRY E. KITTREDGE.

Witnesses:
   LUTHER A. HODGDON,
   E. F. UNIAC.